US012651272B2

(12) United States Patent
Noel, Sr.

(10) Patent No.: US 12,651,272 B2
(45) Date of Patent: Jun. 9, 2026

(54) ECONOMIC DEVELOPMENT AND COLLABORATION SYSTEM

(71) Applicant: John C. Noel, Sr., St. Johns, FL (US)

(72) Inventor: John C. Noel, Sr., St. Johns, FL (US)

( * ) Notice: Subject to any disclaimer, the term of this patent is extended or adjusted under 35 U.S.C. 154(b) by 0 days.

(21) Appl. No.: 18/378,252

(22) Filed: Oct. 10, 2023

(65) Prior Publication Data

US 2024/0037587 A1     Feb. 1, 2024

Related U.S. Application Data

(63) Continuation of application No. 16/168,836, filed on Mar. 4, 2019, now Pat. No. 11,816,689.

(51) Int. Cl.
*G06F 13/00* (2006.01)
*G06F 3/0482* (2013.01)
(Continued)

(52) U.S. Cl.
CPC ....... *G06Q 30/0203* (2013.01); *G06F 3/0482* (2013.01); *G06F 3/0483* (2013.01); *G06F 16/252* (2019.01); *G06F 16/29* (2019.01); *G06F 16/9038* (2019.01); *G06F 16/904* (2019.01); *G06F 16/9536* (2019.01); *G06Q 10/06315* (2013.01); *G06Q 30/0201* (2013.01)

(58) Field of Classification Search
CPC ......... G06Q 30/0203; G06Q 10/06315; G06Q 30/0201; G06F 3/0482; G06F 3/0483; G06F 16/252; G06F 16/29; G06F 16/9038; G06F 16/904; G06F 16/9536
USPC ........ 709/204–207, 217–219, 203, 201, 224;

715/751–759, 201; 705/7.34, 7.33, 7.37, 705/1.1
See application file for complete search history.

(56) References Cited

U.S. PATENT DOCUMENTS 6,631,184 B1    10/2003  Weiner
9,311,726 B2 *   4/2016  Den Herder ............ G06F 16/29
(Continued)

OTHER PUBLICATIONS

Willis, Carrie, "Help bring Trader Joe's to Rohnert Park." Post on Nextdoor.com, Jun. 21, 2018, <https://nextdoor.com/agency-post/ca/rohnert-park/city-of-rohnert-park/help-bring-trader-joes-to-rohnert park-85315157 />.

*Primary Examiner* — Kenneth R Coulter
(74) *Attorney, Agent, or Firm* — Lippes Mathias LLP; Mitchell Ghaneie; Josephine Chen

(57) ABSTRACT

An exemplary embodiment of the present invention provides an economic development system, which enables individuals within a community to efficiently identify and express their interests in one or more economic propositions. The economic development system comprises an application which allows users to uniquely interface with the one or more economic propositions. Users of the economic development system are able to efficiently identify and express support or disapprove for one or more economic propositions. A plurality of engagement mechanisms is provided by the economic development system to assist users in democratizing their interests. The economic development system also allows for crowdfunding of economic propositions and further provides valuable statistical data which can be utilized by developers, business owners, and local municipalities to implement one or more economic propositions.

20 Claims, 8 Drawing Sheets

(51) Int. Cl.

| | |
|---|---|
| *G06F 3/0483* | (2013.01) |
| *G06F 16/25* | (2019.01) |
| *G06F 16/29* | (2019.01) |
| *G06F 16/9038* | (2019.01) |
| *G06F 16/904* | (2019.01) |
| *G06F 16/9536* | (2019.01) |
| *G06Q 10/0631* | (2023.01) |
| *G06Q 30/0201* | (2023.01) |
| *G06Q 30/0203* | (2023.01) |

(56) References Cited

U.S. PATENT DOCUMENTS

| | | | |
|---|---|---|---|
| 9,461,876 B2 | 10/2016 | Van Dusen et al. | |
| 10,235,025 B2 | 3/2019 | Falaki et al. | |
| 11,080,336 B2 | 8/2021 | Van Dusen | |
| 11,334,850 B2 | 5/2022 | Noel, Sr. | |
| 11,645,667 B2 * | 5/2023 | Noel, Sr. ............... | G06Q 50/01 |
| | | | 715/201 |
| 11,816,689 B2 * | 11/2023 | Noel, Sr. ............... | G06F 3/0482 |
| 2011/0054949 A1 | 3/2011 | Joye et al. | |
| 2011/0093539 A1 | 4/2011 | Laurin et al. | |
| 2014/0063020 A1 | 3/2014 | Den Herder et al. | |
| 2014/0075004 A1 | 3/2014 | Van Dusen et al. | |
| 2014/0200963 A1 | 7/2014 | Abhyanker | |
| 2015/0378587 A1 | 12/2015 | Falaki et al. | |
| 2015/0381379 A1 | 12/2015 | O'Sullivan | |
| 2016/0300251 A1 | 10/2016 | Den Herder et al. | |
| 2017/0235848 A1 | 8/2017 | Van Dusen et al. | |
| 2021/0192547 A1 | 6/2021 | Henderson | |

* cited by examiner

70

ECONOMIC DEVELOPMENT AND COLLABORATION SYSTEM

CROSS-REFERENCE TO RELATED APPLICATIONS

The present nonprovisional patent application is a continuation of U.S. patent application Ser. No. 16/168,836, now U.S. Pat. No. 11,816,689, filed on Mar. 4, 2019.

FIELD OF THE INVENTION

This invention relates generally to an economic development system for evaluating and effectuating community interest.

BACKGROUND

A significant number of people in society have a desire to build, have built, improve, renovate, relocate or replace businesses in various areas. To facilitate the collective desires of a community, large amounts of data need to be collected, and then, communicated to entities that can either create or improve existing businesses in an effort to meet the needs of the people.

Online activity of users collaborating with one another generates valuable information concerning the users, their needs, and their interests. The aggregation and analysis of such information can provide business professionals and government officials with useful insight regarding new development or changes to existing businesses. However, such information is not readily accessible nor efficiently aggregated and organized to disseminate to those with the power and resources to effectuate such communal interests.

What is needed is a web-based collaboration system which allows for individuals within a community to efficiently and effectively identify one or more locations, to which the individuals may discuss, deliberate over, or otherwise publicly propose the development of new businesses, or modification(s) to existing businesses so that such information can be readily accessed and utilized.

SUMMARY OF THE INVENTION

An exemplary embodiment of the present invention provides an economic development and collaboration system. The economic development and collaboration system, hereinafter referred to as the "EDC System," enables individuals within a community to efficiently identify and express their interests in one or more economic propositions. The EDC System comprises an interactive map, a geographical location, a software application, one or more personal computing devices, a network, and at least one database, which stores information, including, but not limited to, information pertaining to the one or more economic propositions published within the EDC System.

The one or more economic propositions may comprise the development of new businesses or modification(s) to existing businesses. The one or more economic propositions are characterized by a plurality of attributes. The plurality of attributes may comprise a location, a written description of the existing condition of the location, and a written description of the economic proposition.

The EDC System allows its users to view one or more economic propositions, express their opinion of the one or more economic propositions, communicate with one or more other users, collaborate with the user that published the economic proposition, and raise public awareness within the community about one or more economic propositions. Such expression of support or disapproval by a user may be manifested using a plurality of engagement mechanisms provided by the EDC System. The plurality of engagement mechanisms comprises quantitative and qualitative mechanisms. Additionally, the EDC System enables for the creation of one or more new and competing alternative economic propositions at the same location of an existing economic proposition.

NUMBER REFERENCES

Figure 1:
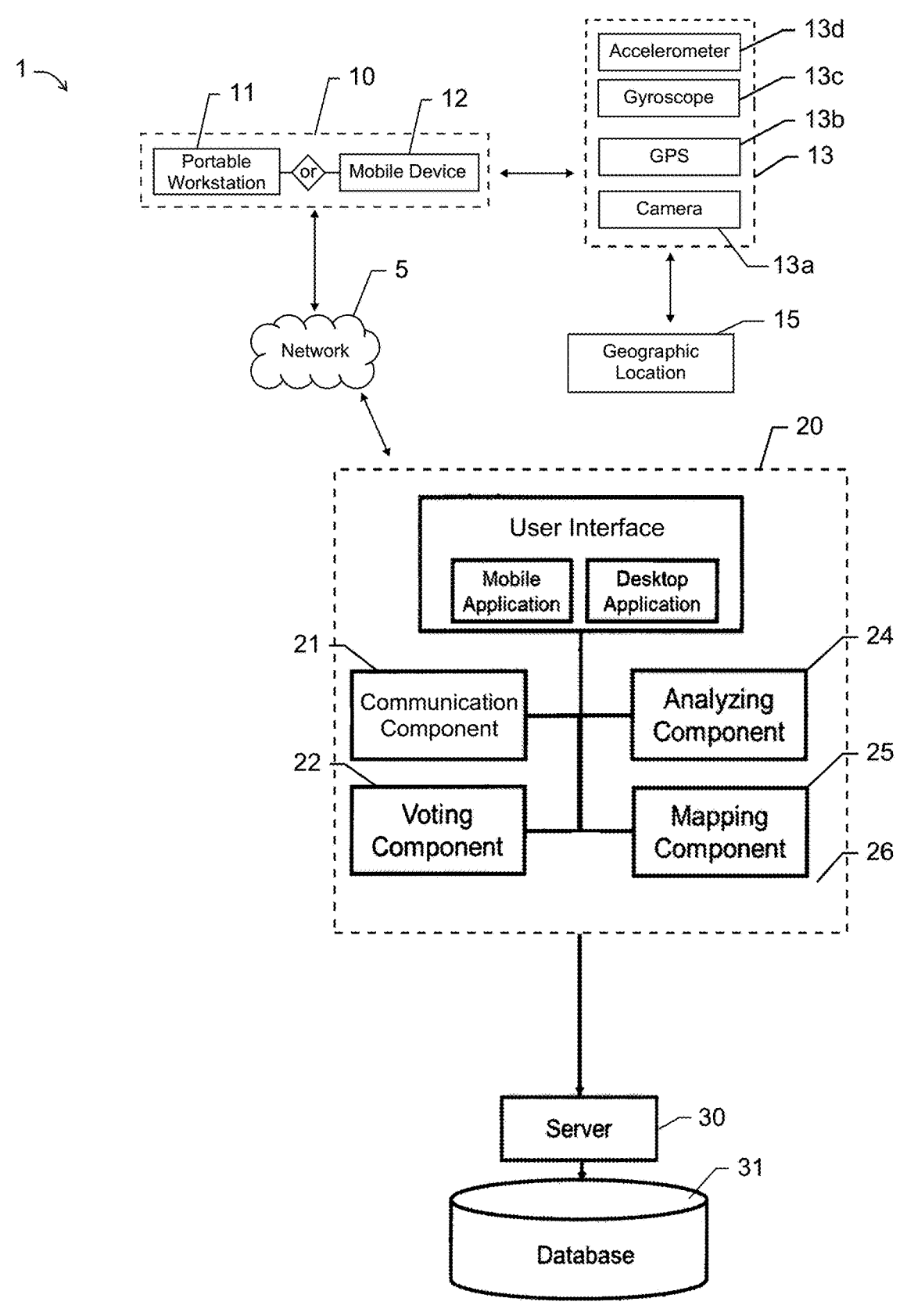
FIG. 1 depicts a schematic diagram that shows an exemplary embodiment of the economic development and collaboration system.

1—Economic development and collaboration system
5—Network
10—Personal computing device
11—Portable workstation
12—Mobile device
13—Plurality of sensors
13a—Camera
13b—GPS
13d—Accelerometer
15—Geographical location
20—Software application
21—Communication component
22—Voting component
24—Analyzing Component
25—Mapping component 30—Server
31—Database
50—Public-facing homepage
60—User homepage
60—Water Source
70—Economic proposition detail page
80—Economic proposition locator page
90—User account page

DETAILED DESCRIPTION OF THE INVENTION

A non-limiting embodiment of an Economic Development and Collaboration System 1 uniquely enables individuals within a community to efficiently identify and express their interests in one or more economic propositions. The Economic Development and Collaboration System 1, hereinafter referred to as the "EDC System" 1, comprises at least one geographical location 15, a network 5, one or more personal computing devices 10, a software application 20, and at least one database 31. The at least one geographical location 15 is physical location of property wherein a business is located or could be located. The network 5 has a plurality of end nodes which are wirelessly connected to it. The one or more personal computing devices 10 may comprise a portable workstation 11 or a mobile device 12. The one or more personal computing devices 10 must be capable of connecting to the network 5. It is further required that the one or more personal computing devices 10 either provide a plurality of sensors 13. The plurality of sensors 13 may include a camera 13a, a global position system ("GPS") 13b, a gyroscope, 13c, or an accelerometer 13d. The software application 20 provides at least one user account for each user. The software application 20 is connected to the network 5 and synced to the database 31. The software application 20 comprises a communication component 21, a voting component 22, an analyzing component 24, and an interactive mapping component 25.

The EDC System 1 further comprises one or more servers 30, which store the database 31. The database 31 stores a plurality of information, which includes the one or more economic propositions. The database 31 must be accessible remotely through the network 5. The database 31 is updated by the software application 20 in real-time. Such real-time updates provided by the software application 20 are prompted directly or indirectly by one or more users.

The software application 20 is downloadable on a personal computing device 10. The software application 20 may also be a web-based application accessible through an internet browser connected to the network 5. The software application 20 provides a user interface for users to access and engage with information stored in the database 31. A user of the EDC System 1 may only fully access and engage with the software application 20 after creating a user account. The software application 20 requires the user to disclose predetermined personal data when creating a user account. If a user elects to not create a user account, the software application 20 will restrict the user's access to a portion of the information stored within the database 31. The user's personal user data collected during the creation of a user account allows for additional user metadata to be aggregated by the EDC System 1. Such additional user metadata, in combination with the personal user data provided by the users, is utilized by the analyzing component 24.

The one or more economic propositions may comprise the development of new businesses or modification(s) to existing businesses and/or buildings. The one or more economic propositions are characterized by a plurality of attributes. The plurality of attributes may comprise a location, one or more photographs or videos of the existing location, one or more visual renderings of the economic proposition, a written description of the existing condition of the geographic location, and a written description of the economic proposition. The analyzing component 24 aggregates data accumulated from the one or more economic propositions in combination with data generated directly and indirectly from its users to provide a plurality of first order and second order statistics describing the economic propositions. First order statistics comprises analytics of data generated directly from one or more users. Second order statistics comprises analytics of data generated directly and indirectly from one or more users.

The software application 20 allows its users to view and/or create one or more economic propositions as well as express their support or disapproval of the one or more economic propositions. Such expression of support or disapproval by a user may be manifested using a plurality of engagement mechanisms provided by the software application's communication component 21 or voting component 22. However, before a user creates an economic proposition or is able to express their support or disapprove of an economic proposition, the user must first select at least one user type from a predetermined plurality of user types, which describe the user's relationship to a particular economic proposition. The predetermined plurality of user types may comprise an individual consumer/patron, a business owner, a developer, or a public official. It is anticipated that when a user identifies as anything other than a consumer/patron, the software application 20 may require the user to submit additional credentials to verify their respective user type selection.

The software application 20 provides an economic proposition detail page 70 for each economic proposition. The economic proposition detail page 70 provides information input by the user who created the economic proposition, additional information provided by other users, and statistical data provided by the analyzing component 24.

The voting component 22 enables each user to cast a single vote for each economic proposition in support of or disapproval of the economic proposition. The communication component 21 enables users to leave comments on each of the one or more economic proposition detail pages 70, which allows for the formation of one or more comment threads. Such comments may include a variety of public forms of expression, such as written comments, videos, pictures, gifs, emojis, etc. The comment threads are analyzed by the analyzing component 24 to gain deeper insights regarding the collective interest in an economic proposition. Comment threads provided by the communication component 21 are filterable. The communication component 21 enables users to also track and be notified about other users' activities within the EDI System 1.

The mapping component 25 may interface with one or more third-party geospatial mapping applications. When a user wishes to create a new economic proposition, the software application 20 requests the user specify the geographic location 15 of the economic proposition by either inputting its location specific information, such as a mailing address, or selecting the economic proposition's location on an interactive map provided by the mapping component 25. After the geographic location 15 of an economic proposition has been input, the mapping component 25 provides a geolocation icon on the interactive map which visually identifies the location of the economic proposition. Similarly, a user may perform a text-based search for an economic proposition to filter economic propositions displayed by the interactive map. Additionally, the mapping component 25 also allows users to create of one or more alternative economic propositions at the same location of an existing economic proposition.

Figure 2:
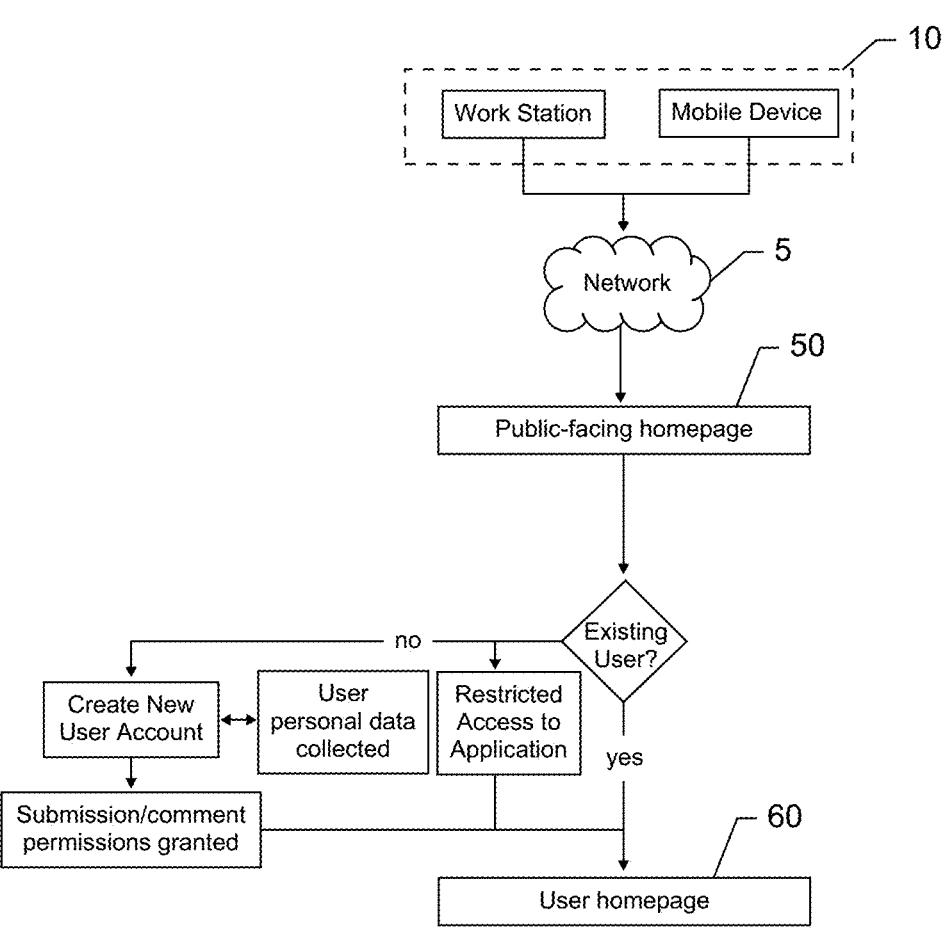
FIG. 2 depicts a schematic diagram that shows how the economic development and collaboration system may be accessed.
Figure 3:
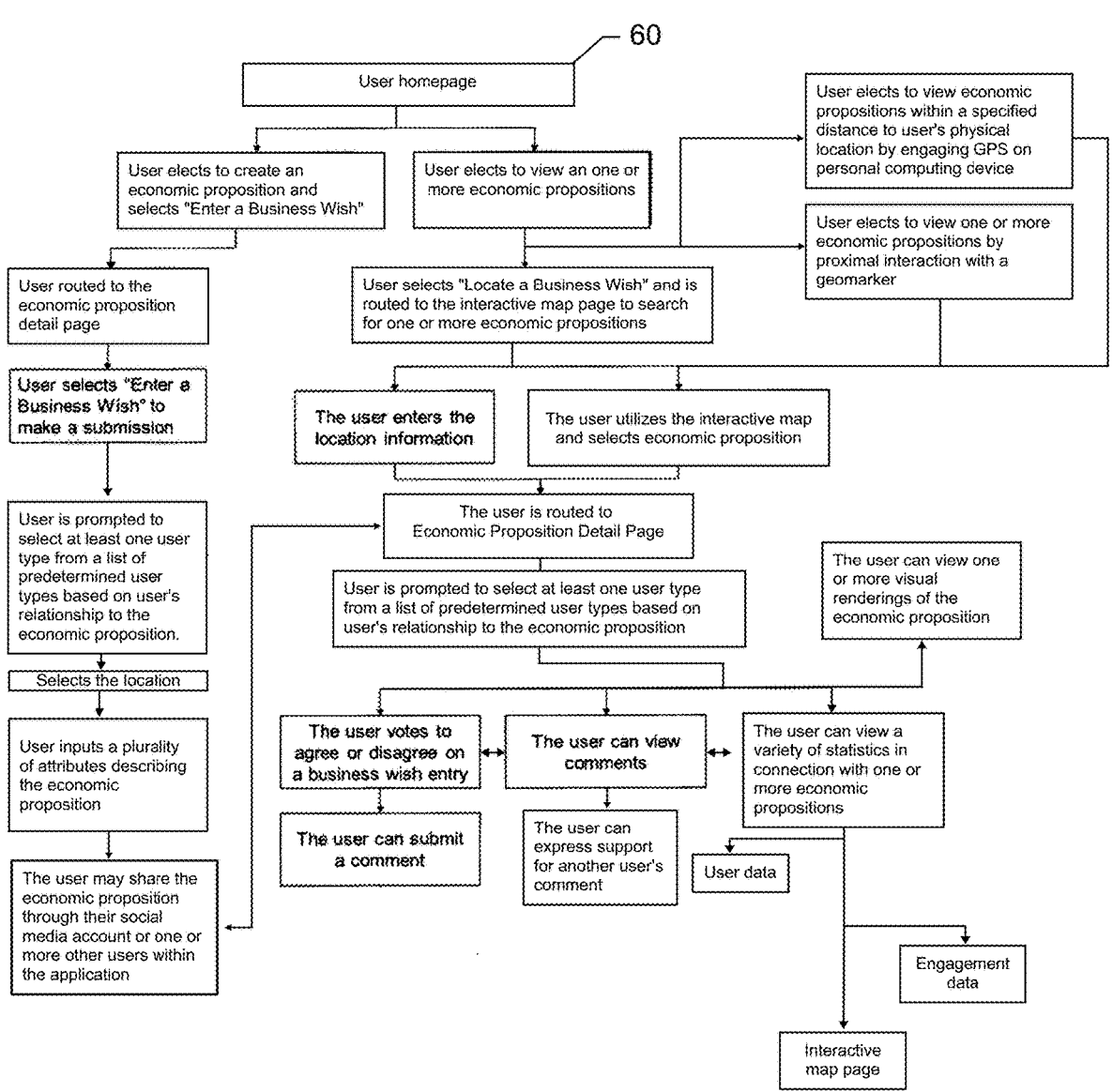
FIG. 3 depicts a schematic diagram that shows how a user of the economic development and collaboration system may access information relating to one or more economic propositions as well as engage and interact with other users of the economic development and collaboration system.
Figure 4:
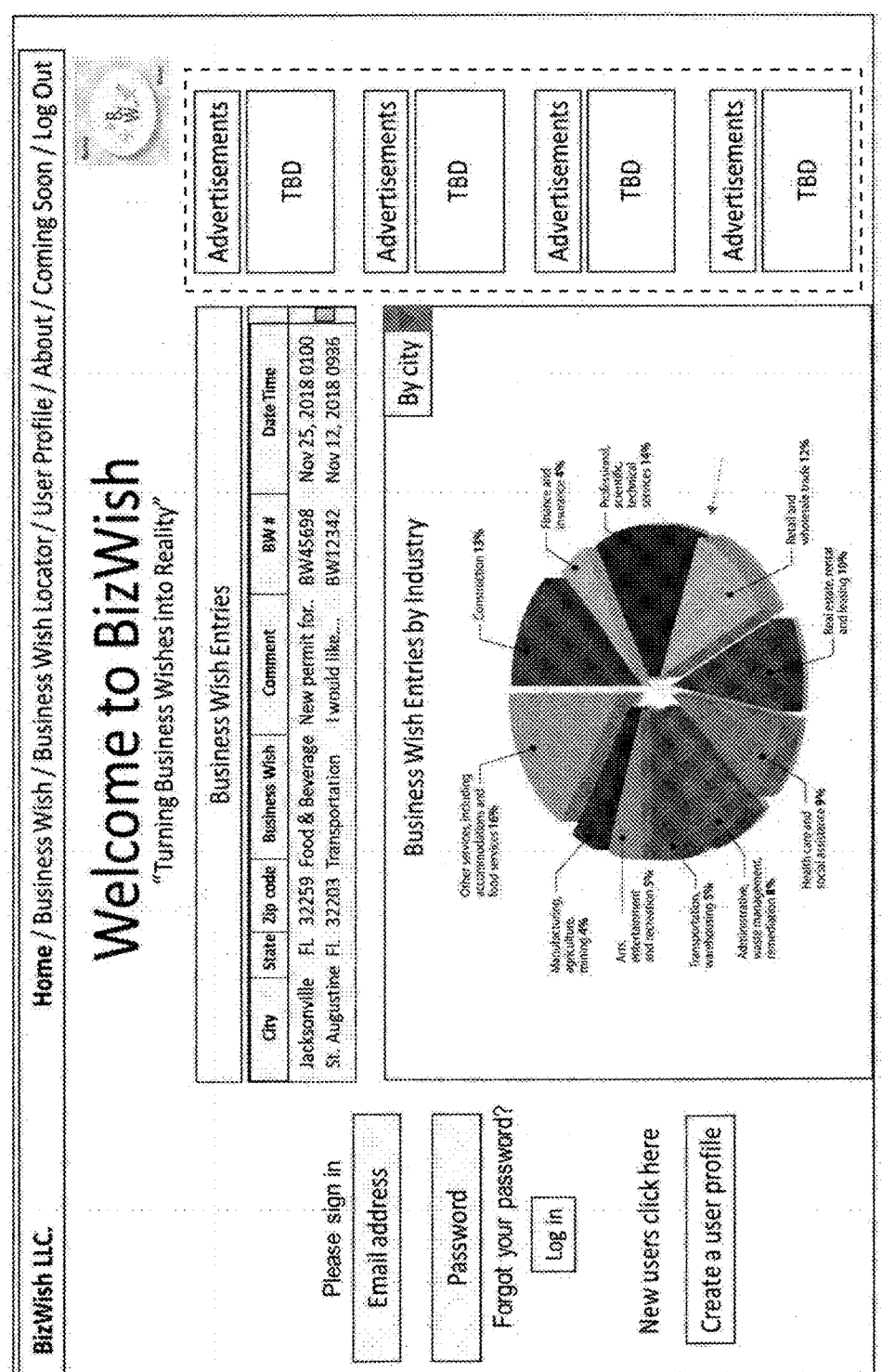
FIG. 4 is an exemplary embodiment of a public-facing homepage of a web application for an economic development and collaboration system depicting statistical data of economic propositions and advertisements.

FIG. 4 illustrates an exemplary public-facing homepage 50 which allows for limited review of statistical data without signing into a user account. As shown in FIG. 2, existing users can sign into their accounts using their username and password. New users will need to create a user account to fully access the statistical data associated with the EDC System 1 as well as engage the software application 20 and interact with other users.

Figure 5:
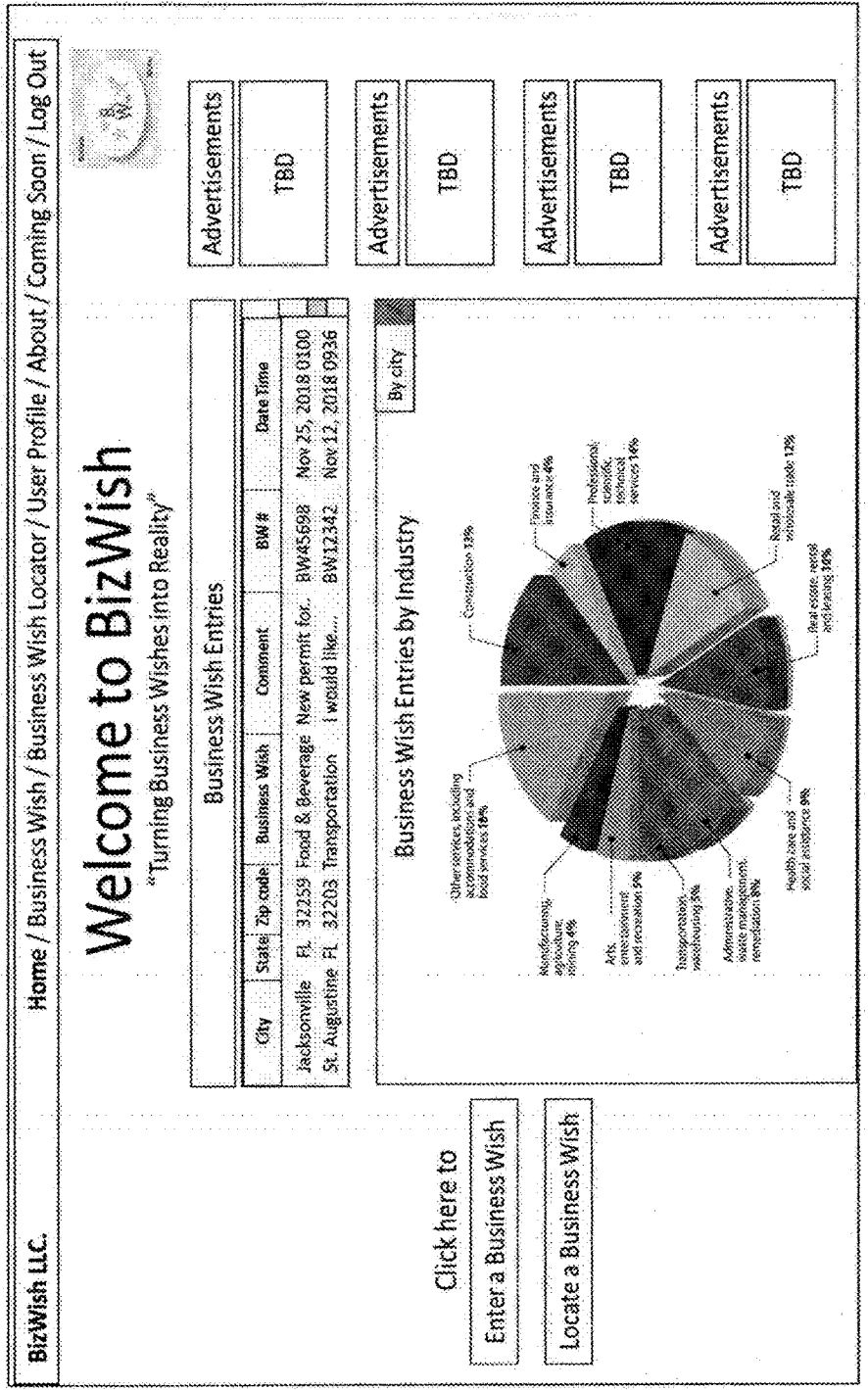
FIG. 5 is an exemplary embodiment of a user homepage of the web application for the economic development and collaboration system depicting various statistical data of economic propositions, advertisements, and access and utilize a plurality of engagement mechanisms provided by the economic development system.

FIG. 5 illustrates an exemplary user homepage 60 with new options for further access to statistical data provided by the EDC System 1. From the user homepage 60 a user can create a new economic proposition or locate an existing economic proposition. Cumulative statistical data pertaining to the economic propositions within the EDC System 1 is provided on the user homepage 60.

Figure 6:
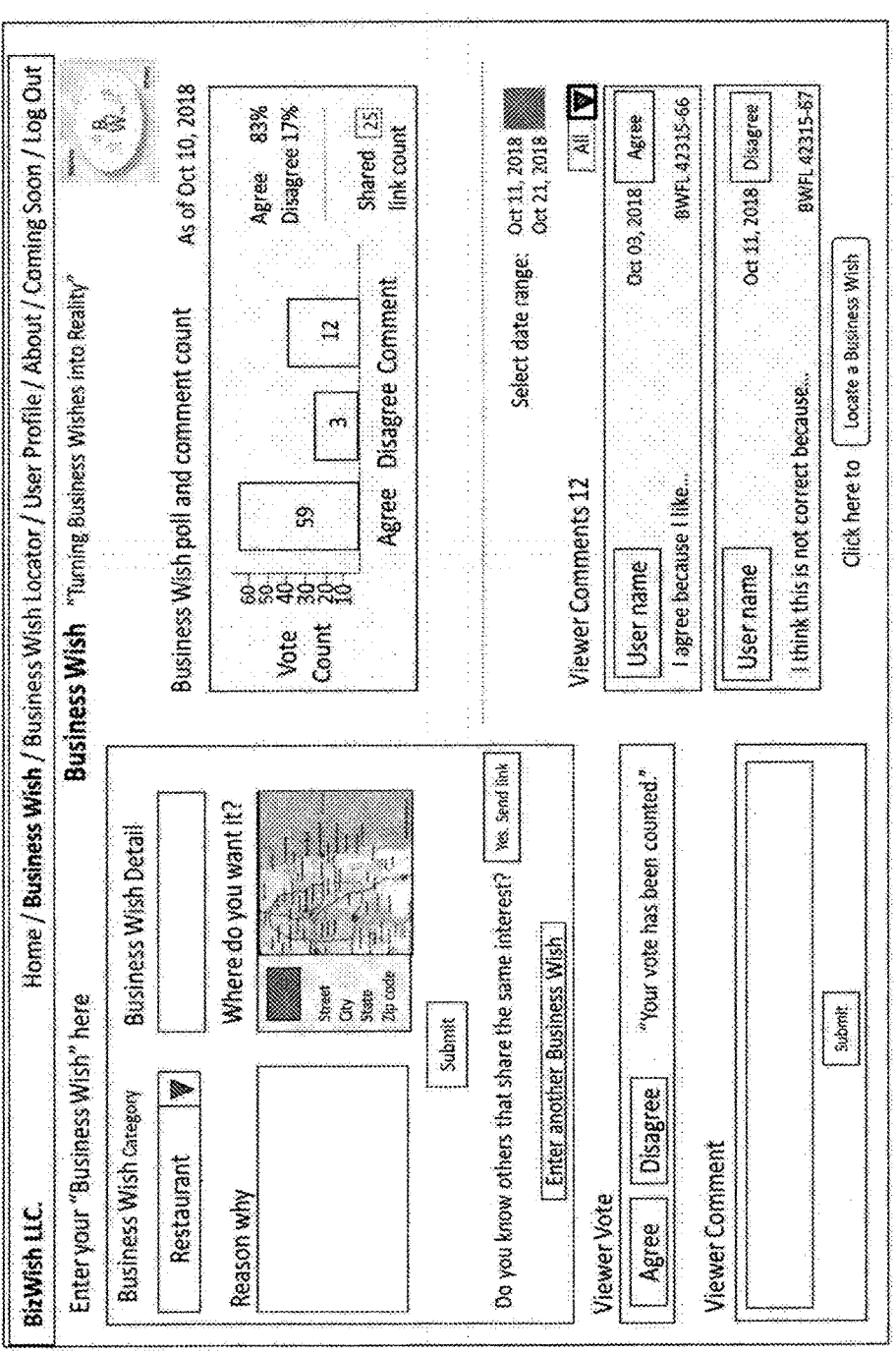
FIG. 6 is an exemplary embodiment of an economic proposition profile page of the web application for the economic development and collaboration system depicting a collaboration environment where users can submit and/or review economic propositions using the plurality of engagement mechanisms to express their support or disapproval of one or more economic propositions.

FIG. 6 illustrates an exemplary economic proposition detail page 70 specific to a particular economic proposition. The communication component 21 allows users to directly send a link to the economic proposition detail page 70 from the economic proposition detail page 70 to any email address. Users can view the related economic proposition statistics, provided by the analyzing component 24, on the economic proposition detail page 70 as well. Users can quickly assess the status of the corresponding economic proposition by viewing cumulative statistics of all economic propositions or a filtered subset thereof.

Figure 7:
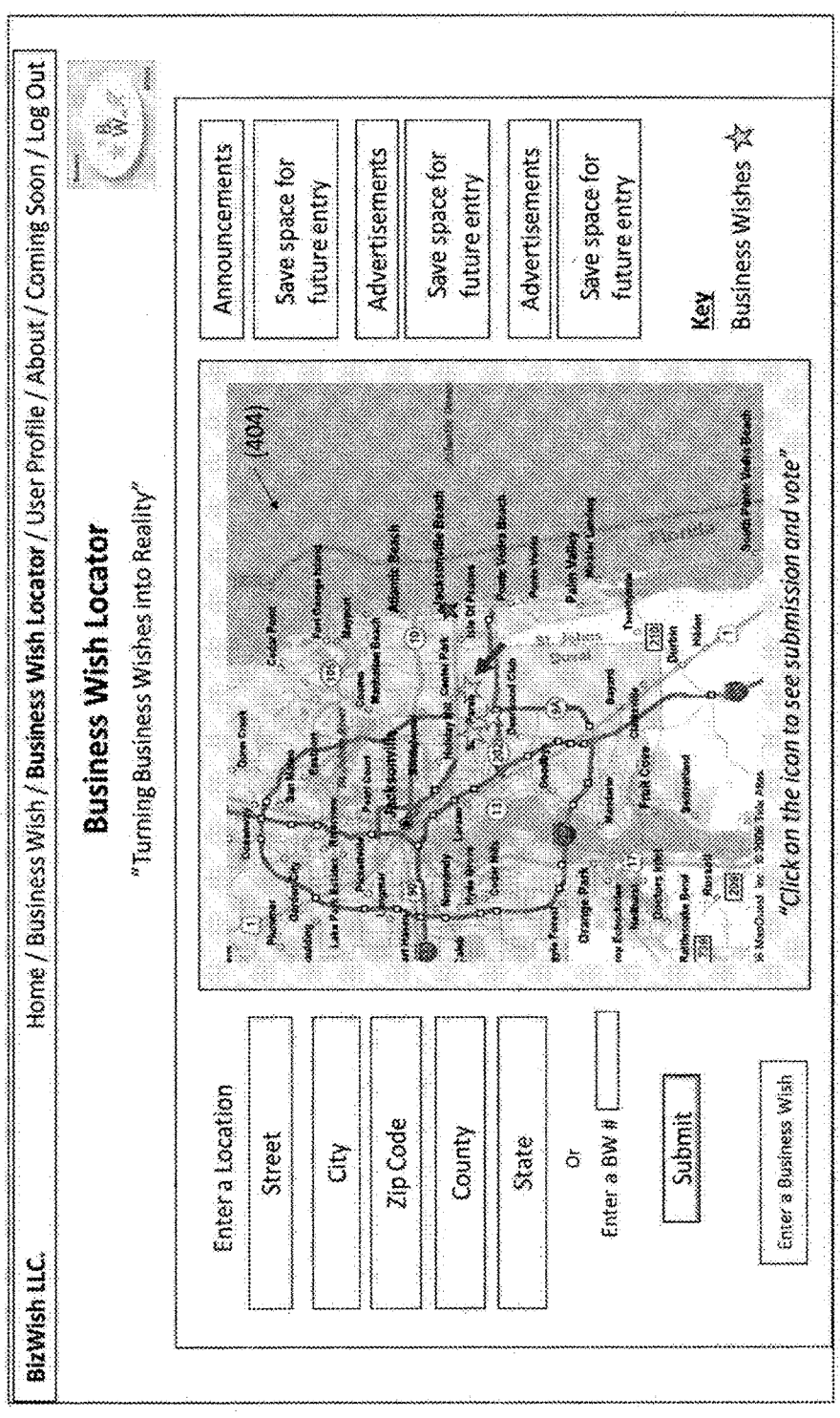
FIG. 7 is an exemplary embodiment of an economic proposition locator page of the web application for the economic development and collaboration system depicting locations of economic propositions on an interactive map.

FIG. 7 illustrates an exemplary economic proposition locator page 80. This page allows users to view existing economic propositions on the interactive map, provided by the mapping component 25. The interactive map identifies any economic propositions within its boundaries. Users can enter a specific location information such as, but not limited to; street, city, zip code, county, state, or geocoordinates to perform a text-based search for an economic proposition. Alternatively, each economic proposition is further indexed with a BW #, which may be used as an additional indexing reference and assist the software application 20 in quickly queries the database 31 for a specific economic proposition.

Figure 8:
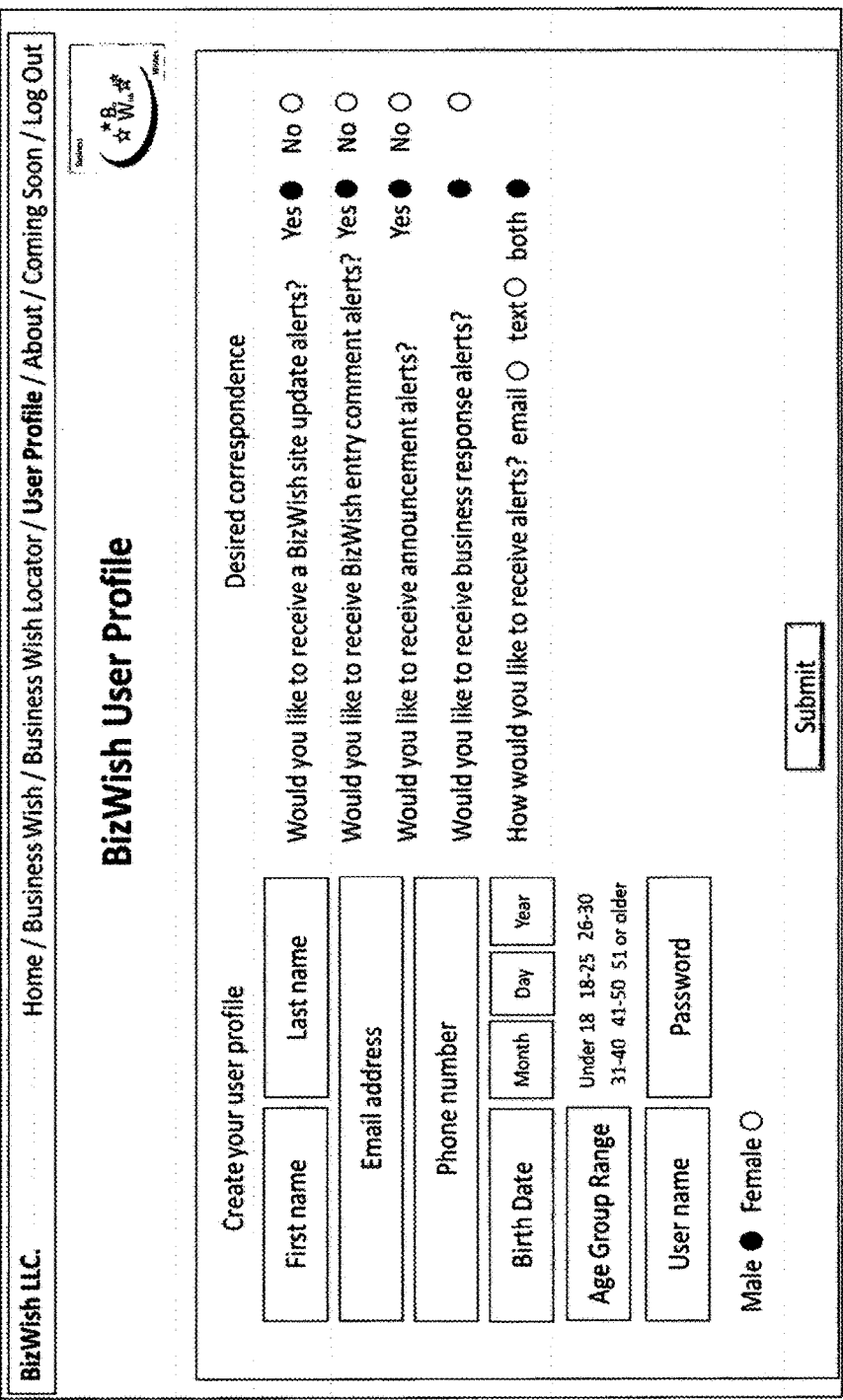
FIG. 8 is an exemplary embodiment of a user account page of the web application for the economic development and collaboration system depicting exemplary information collected from the user.

FIG. 8 illustrates an exemplary user account page 90. Users will be able to create economic propositions upon successful creation of a user account. The analyzing component 24 uses each user's personal user data, in additional with other data, to improve one or more statistics of the plurality of statistics it creates.

While the exemplary embodiment of the present disclosure has been disclosed, certain modifications may be made by those skilled in the art to modify the invention without departing from the spirit of the invention.

The invention claimed is:

1. An economic development and collaboration system comprising:
  a. a network;
  b. one or more personal computing devices;
    wherein the one or more personal computing devices are connected to the network;
  c. one or more servers;
    wherein the one or more servers are connected to the network;
  d. a database;
    wherein the database is stored on the one or more servers;
  e. one or more economic propositions;
    wherein each of the one or more economic propositions is further comprised of a plurality of attributes;
    wherein the plurality of attributes being further comprised of a written description;
    wherein the one or more economic propositions are stored on the database;
  f. at least one geographical location;
    each of the at least one geographical location being a physical location;
    each of the at least one geographical location being associated with the one or more economic propositions;
    each of the at least one geographic location being described in the written description;
  g. a software application;
    wherein the software application is downloadable on the one or more personal computing devices;
    wherein the software application is connected to the network and synced to the database;
    wherein the software application provides at least one user account for each user of a plurality of users;
    wherein the at least one user account comprises disclosed personal data of the user;
    wherein the one or more economic propositions are submitted through the software application for viewing by one or more other users.

2. The economic development and collaboration system as described in claim 1, wherein the one or more personal computing devices comprise a portable workstation or mobile device.

3. The economic development and collaboration system as described in claim 2, the one or more personal computing devices comprises a camera, a global position system, a gyroscope, or an accelerometer.

4. The economic development and collaboration system as described in claim 1, wherein the one or more economic propositions comprise either a new business or a modification to an existing business.

5. The economic development and collaboration system as described in claim 1, wherein the software application further comprises:
  a mapping component:
    the mapping component providing an interactive map;
    the mapping component generating one or more geolocation icons on the interactive map; and
    the one or more geolocation icons being associated with each of the at least one geographical location.

6. The economic development and collaboration system as described in claim 1, wherein the software application further comprises:
  a communication component;
    the communication component allowing each user of the plurality of users to communicate with one or more other users;
    the communication component provides one or more comment threads; and
    the communication component being associated with each of the at least one geographical location.

7. The economic development and collaboration system as described in claim 1, wherein the plurality of attributes comprises a location, one or more photographs or videos of the existing location, one or more visual renderings of the economic proposition, and wherein the written description of the existing condition of the geographic location.

8. An economic development and collaboration system comprising:

a. a network;

b. one or more personal computing devices;

wherein the one or more personal computing devices are connected to the network;

c. one or more servers;

wherein the one or more servers are connected to the network;

d. a database;

wherein the database is stored on the one or more servers;

wherein the database stores a plurality of attributes relating to one or more economic propositions;

e. at least one geographical location;

each of the at least one geographical location being a physical location;

each of the at least one geographical location being associated with the one or more economic propositions;

the at least one geographic location being described in a written description;

f. a software application;

wherein the software application is downloadable on the one or more personal computing devices;

wherein the software application is connected to the network and synced to the database;

wherein the software application provides at least one user account for each user of a plurality of users;

wherein the at least one user account comprises disclosed personal data of the user;

wherein the one or more economic proposals propositions are submitted through the software application for viewing by one or more other users; and wherein the software application further comprises:

a mapping component;

the mapping component providing an interactive map;

the mapping component generating one or more geolocation icons on the interactive map;

the one or more geolocation icons being associated with each of the at least one geographical location.

9. The economic development and collaboration system as described in claim 8, wherein the one or more personal computing devices comprise a portable workstation or mobile device.

10. The economic development and collaboration system as described in claim 9, the one or more personal computing devices comprises a camera, a global position system, a gyroscope, or an accelerometer.

11. The economic development and collaboration system as described in claim 8, wherein the one or more economic propositions comprise either a new business or a modification to an existing business.

12. The economic development and collaboration system as described in claim 8, wherein the interactive map may display one or more geolocation icons representing the one or more economic propositions.

13. The economic development and collaboration system as described in claim 8, wherein the software application further comprises:

a communication component;

the communication component allowing each user of the plurality of users to communicate with one or more other users;

the communication component provides one or more comment threads; and the communication component being associated with each of the at least one geographical location.

14. The economic development and collaboration system as described in claim 8, wherein the plurality of attributes comprises a location, one or more photographs or videos of the existing location, one or more visual renderings of the economic proposition, a written description of the existing condition of the geographic location, and the written description of the economic proposition.

15. An economic development and collaboration system comprising:

a. a network;

b. one or more personal computing devices;

wherein the one or more personal computing devices are connected to the network;

c. one or more servers;

wherein the one or more servers are connected to the network;

d. a database; wherein the database is stored on the one or more servers;

wherein the database stores a plurality of attributes relating to one or more economic propositions;

e. at least one geographical location;

each of the at least one geographical location being a physical location;

each of the at least one geographical location being associated with the one or more economic propositions;

the at least one geographic location being described in a written description;

f. a software application;

wherein the software application is downloadable on the one or more personal computing devices;

wherein the software application is connected to the network and synced to the database;

wherein the software application provides at least one user account for each user of a plurality of users;

wherein the at least one user account comprises disclosed personal data of the user;

wherein the one or more economic propositions are submitted through the software application for viewing by one or more other users; and wherein the software application further comprises:

a voting component;

the voting component allows the plurality of users to cast a vote for each of the one or more economic propositions.

16. The economic development and collaboration system as described in claim 15, wherein the one or more personal computing devices comprise a portable workstation or mobile device.

17. The economic development and collaboration system as described in claim 15, wherein the one or more economic propositions comprise either a new business or a modification to an existing business.

18. The economic development and collaboration system as described in claim 15, wherein the software application further comprises a mapping component; the mapping component providing an interactive map; the mapping component generating one or more geolocation icons on the interactive map; the one or more geolocation icons being associated with each of the at least one geographical location.

19. The economic development and collaboration system as described in claim 15, wherein the software application further comprises:

a communication component;

the communication component allowing each user of the plurality of users to communicate with one or more other users;

the communication component provides one or more comment threads; and the communication component being associated with each of the at least one geographical location.

20. The economic development and collaboration system as described in claim 15, wherein the plurality of attributes comprises a location, one or more photographs or videos of the existing location, one or more visual renderings of the economic proposition, a written description of the existing condition of the geographic location, and a written description of the economic proposition.

* * * * *